(12) United States Patent
Millman-Wood

(10) Patent No.: US 9,168,941 B2
(45) Date of Patent: Oct. 27, 2015

(54) CONVERTIBLE STROLLER ASSEMBLY

(71) Applicant: Helen Millman-Wood, Vero Beach, FL (US)

(72) Inventor: Helen Millman-Wood, Vero Beach, FL (US)

(*) Notice: Subject to any disclaimer, the term of this patent is extended or adjusted under 35 U.S.C. 154(b) by 0 days.

(21) Appl. No.: 14/159,650

(22) Filed: Jan. 21, 2014

(65) Prior Publication Data
US 2014/0312599 A1 Oct. 23, 2014

Related U.S. Application Data

(60) Provisional application No. 61/754,790, filed on Jan. 21, 2013.

(51) Int. Cl.
B62B 7/12 (2006.01)
B62B 7/14 (2006.01)
B62B 7/08 (2006.01)

(52) U.S. Cl.
CPC ............... *B62B 7/145* (2013.01); *B62B 7/083* (2013.01); *B62B 7/12* (2013.01)

(58) Field of Classification Search
CPC . B62B 7/06–7/066; B62B 7/08; B62B 7/083; B62B 7/086; B62B 7/10; B62B 7/12
USPC ........................................................ 280/650
See application file for complete search history.

(56) References Cited

U.S. PATENT DOCUMENTS

| 4,586,721 | A  | * | 5/1986 | Harada et al. | 280/30 |
| 4,747,526 | A  | * | 5/1988 | Launes | 224/155 |
| 4,762,256 | A  | * | 8/1988 | Whitaker | 224/161 |
| 6,460,866 | B1 | * | 10/2002 | Altschul et al. | 280/30 |
| 8,020,879 | B1 | * | 9/2011 | Engdahl | 280/30 |
| 2008/0042379 | A1 | * | 2/2008 | Amran | 280/30 |
| 2010/0301587 | A1 | * | 12/2010 | Gilbertson et al. | 280/650 |
| 2012/0306181 | A1 | * | 12/2012 | Clifton | 280/647 |

* cited by examiner

Primary Examiner — Jeffrey J Restifo
Assistant Examiner — Erez Gurari
(74) Attorney, Agent, or Firm — Sofer & Haroun, LLP

(57) ABSTRACT

A stroller assembly includes a cushion below the seat fabric connected between the pair of primary rear legs and the pair of lower front legs, the cushion having a pair of straps on an upper side when the stroller assembly is an open configuration. The pair of handle bars are pivotable about the pair of upper hinges to rest against the primary rear legs. The pair of lower front legs are pivotable about the pair of lower hinges to rest against the pair of primary front legs. The cushion is detachable about a pivot axis and configured to be rotated about the pivot axis to such the lower side of the cushion can be rested against lower front legs rested against the pair of primary front legs.

3 Claims, 7 Drawing Sheets

CONVERTIBLE STROLLER ASSEMBLY

RELATED APPLICATION

This application claims the benefit of priority from U.S. Provisional Application No. 61/754,790 filed on Jan. 21, 2013, the entirety of which is incorporated by reference.

BACKGROUND

1. Field of the Invention

This invention relates to a stroller. More particularly, this invention relates to a collapsible stroller for easy transportation in a closed arrangement.

2. Description of the Related Art

Strollers are co only used for an easy means to transport infants and for storage of related items, such as diapers, baby food etc. . . . . Such Strollers come in many shapes and sizes many of which are relatively large and designed to be transported by automobile. Another variety of stroller is the smaller portable stroller usually constructed of lighter materials and used when the stroller must be carried by hand in a closed position over some distances.

All of the above strollers typically have some form of collapsibility feature whereby the stroller can be compressed for storage, transport or carrying. Among the lighter strollers, several of them have been designed to be collapsible to the point where they may be worn or carried by the user for long distance manual transport in the dosed position. For example, each of the following patents and patent applications show some form of collapsible stroller assembly that is either worn as a backpack (with back straps) or foldable into a cartable luggage: U.S. Pat. Nos. 4,620,711, 4,747,526, 5,662,339, 6,155,579, 8,020,879; Design Pat. No. D365,925; and U.S. Patent Publication Nos. 2008/0042379, 2010/072012.

Although many such designs for a portable collapsible wearable stroller are in existence, each of the existing designs either is clunky looking or otherwise aesthetically unappealing, or is uncomfortable to wear.

OBJECTS AND SUMMARY

The present arrangement overcomes the drawbacks associated with the prior art and provides for a portable collapsible stroller assembly that is both easy to use and aesthetically pleasing, while simultaneously being comfortable to wear.

To this end, the present arrangement provides a stroller assembly having a a pair of handle bars, a pair of upper hinges, a pair of primary front legs, a pair of primary rear legs with wheels attached thereto, a second pair of lower hinges and a pair of lower front legs with wheels attached thereto.

A seat fabric is attached to the pair of handle bars, the pair of primary front legs and the pair of primary rear legs and a cushion is provided below the seat fabric connected between the pair of primary rear legs and the pair of lower front legs, the cushion having a pair of straps on an upper side when the stroller assembly is an open configuration.

The pair of handle bars is pivotable about the pair of upper hinges to rest against the primary rear legs, and the pair of lower front legs is pivotable about the pair of lower hinges to rest against the pair of primary front legs. The cushion is detachable about a pivot axis and configured to be rotated about the pivot axis such that the lower side of the cushion can be rested against the lower front legs and rested against the pair of primary front legs.

BRIEF DESCRIPTION OF THE DRAWINGS

The present invention can be understood through the following description and accompanying drawings, wherein.

DETAILED DESCRIPTION

Figure 1:
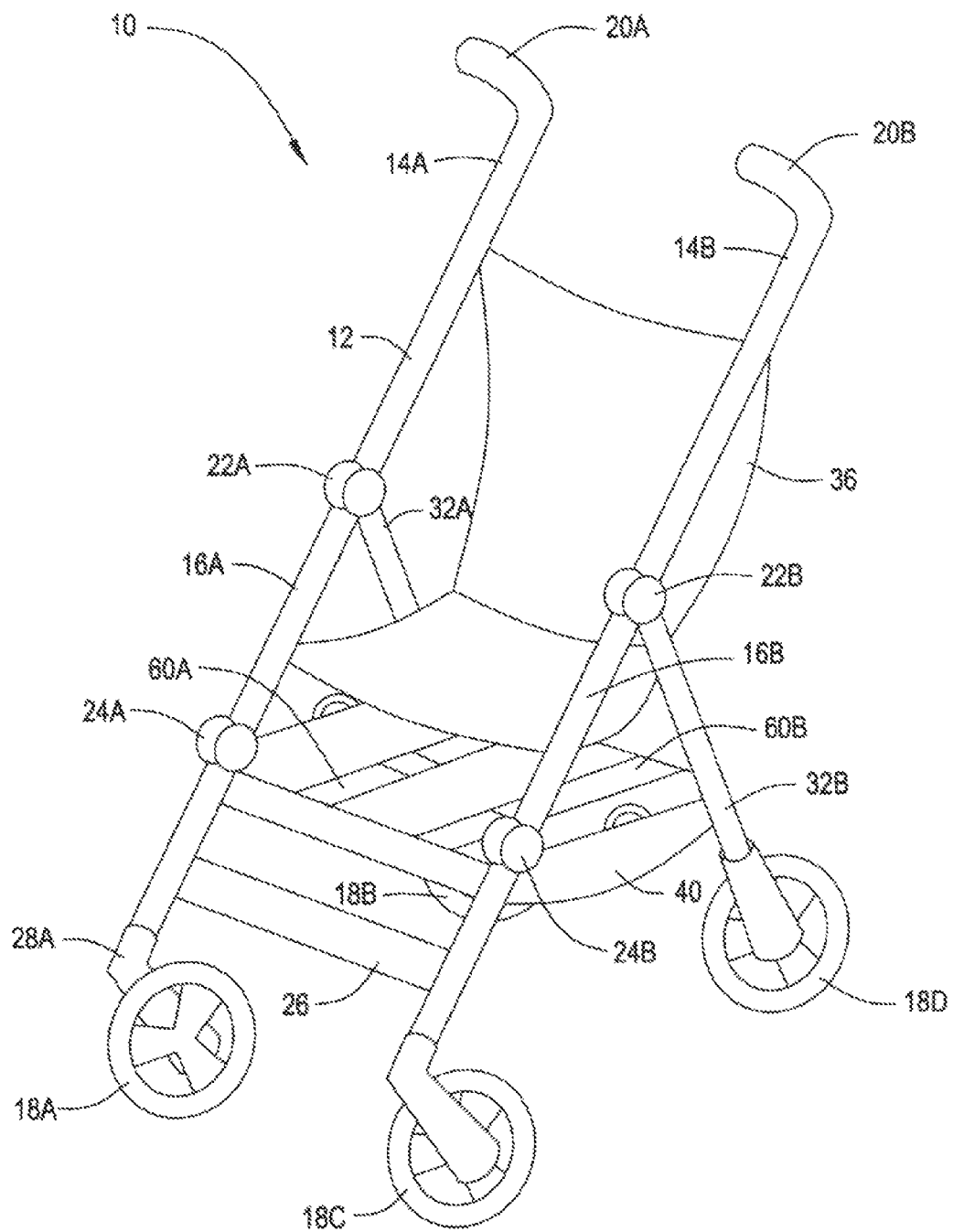
FIG. 1 illustrates a stroller assembly in an open position, in accordance with one embodiment.

In accordance with one embodiment, the present arrangement is directed to a convertible stroller assembly. To this end, FIG. 1 illustrates a foldable stroller 10 in accordance with one embodiment. Stroller 10 includes a frame 12 that is defined by a pair of handle bars 14a and 14b, legs 16a-b and wheels 18a-d.

As illustrated in FIG. 1, each handle bar 14 includes a corresponding push handle 20 at one end and a handle bar hinge 22 at the other end. Push handles 20a and 20b provide a surface for the user to grab the handle for moving the stroller around. From the first handle bar hinge 22a lower legs 16a and 16b extend downwardly towards wheels 18a and 18b. Similarly, from the second handle bar hinge 22b lower legs 16c and 16d extend downwardly towards wheels 18c and 18d.

Lower leg 16a includes a lower leg hinge 24a in the vicinity of the foot rest 26 of the stroller. Similarly lower leg 16b includes a lower leg hinge 24b in the vicinity of the foot rest 26 of the stroller. Legs 28a and 28b correspondingly extend from lower leg hinges 24a and 24b. Furthermore a front wheel 18a is coupled to the end portion of front leg 28a, and a front wheel 18b is coupled to the end portion of front leg 28b.

Extending also from handle bar hinge 22a is rear leg 32a (not visible), which at its end is coupled to rear wheel 18c. Similarly, extending also from handle bar hinge 22b is rear leg 32b, which at its end is coupled to rear wheel 18d.

Handle bar hinge 22a is configured in such a way that when operated, handle bar 14a flips downward and backward and closes adjacent to rear leg 32a. Similarly, handle bar hinge 22b is configured in such a way that when operated, handlebar 14b flips and closes downward and backward adjacent to rear leg 32b. Furthermore, lower leg hinge 24a is configured in such a way that when operated, front leg 28a bends upward to position adjacent to lower leg 16a. Similarly, lower leg hinge 24b is configured in such a way that when operated, front leg 28b bends adjacent to lower leg 16b.

Stroller 10 also includes a seat fabric 36, which according to one embodiment of the invention, is a uniform piece of material dimensioned to fit within frame 12. In such an arrangement seat fabric 36 has a rectangular configuration with a first width that spans the distance between handle bars 14a and 14b and the second width that spans the distance between lower legs 16a and 16b. The length of seat fabric 36 is configured to be long enough to span a distance from handle bars 14a-b to lower legs 16a-b and provide proper support for a child when seated in the stroller.

As shown in FIG. 1, stroller 10, among other features, includes a shoulder back cushion 40 that is fitted horizontally at the bottom of the stroller between the two front legs 16a-b/28a-b and rear legs 32a-b.

Figure 2:
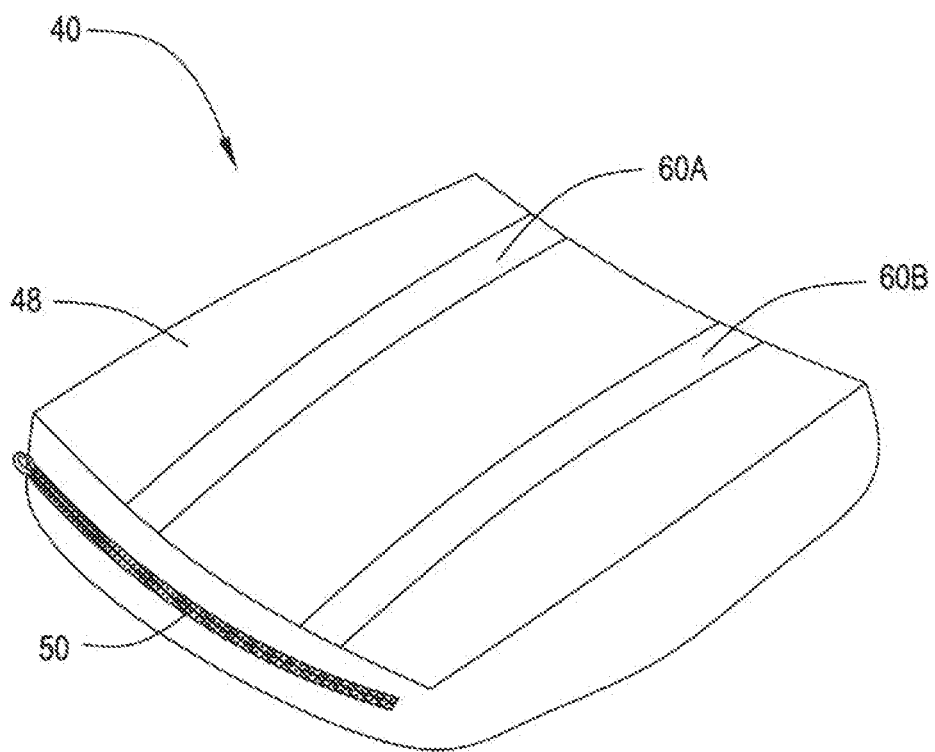
FIG. 2 is an exploded illustration of a cushion of FIG. 1, in accordance with one embodiment.
Figure 3:
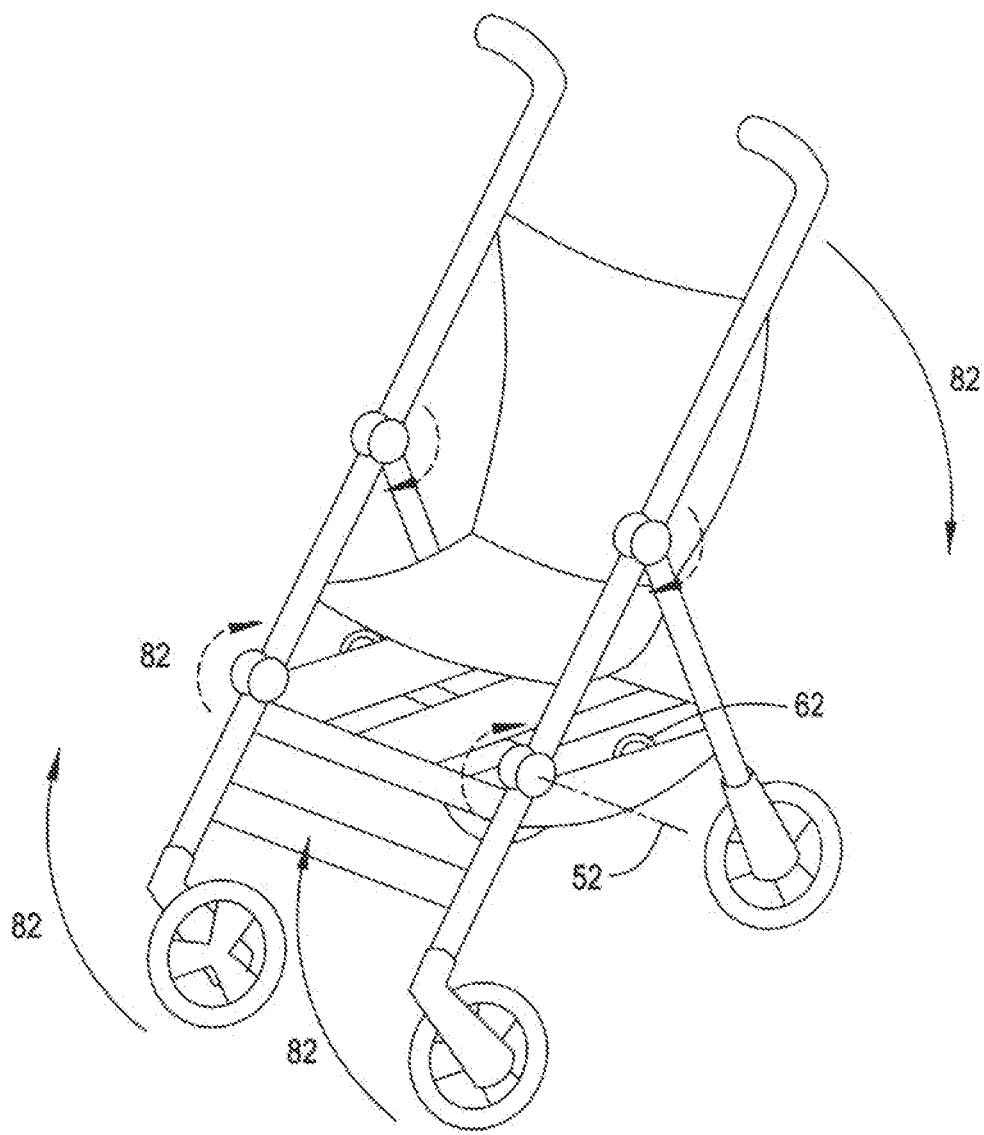
FIG. 3 illustrates the stroller assembly of FIG. 1 in an open position with fold lines, in accordance with one embodiment.

As shown in the isolated cushion FIG. 2, shoulder back cushion 40 is a pad, foam or other compressible material covered by a protective liner 48. Protective liner 48 may include a zipper 50, which is located along one of the widths of the liner allowing for the removal of the liner for replacement or cleaning. Shoulder back cushion 40 includes two adjustable shoulder straps 60a and 60b extending longitudinally along two sides of the top surface of the cushion. The front side of back cushion 40 is pivotally attached to lower legs 16a and 16b, preferably at or near lower hinges 24a and 24b. The rear side of back cushion 40 is removably attached to rear legs 16c and 16d, for example by means of Velcro fasteners or snap buttons.

Turning to the operation of stroller 10, FIGS. 3-7 illustrate the process of folding stroller 10 into the form of a back pack. Beginning with FIG. 3, hinges 22a-b and 24a-b are disengaged and ready for folding. During the folding operation the user first disengages the hinges and unfastens the back side of back cushion 40. Handle bars 14a and 14b are then folded in the direction of arrow 80, and front legs 28a and 28b are folded in the direction of arrow 82.

Figure 4:
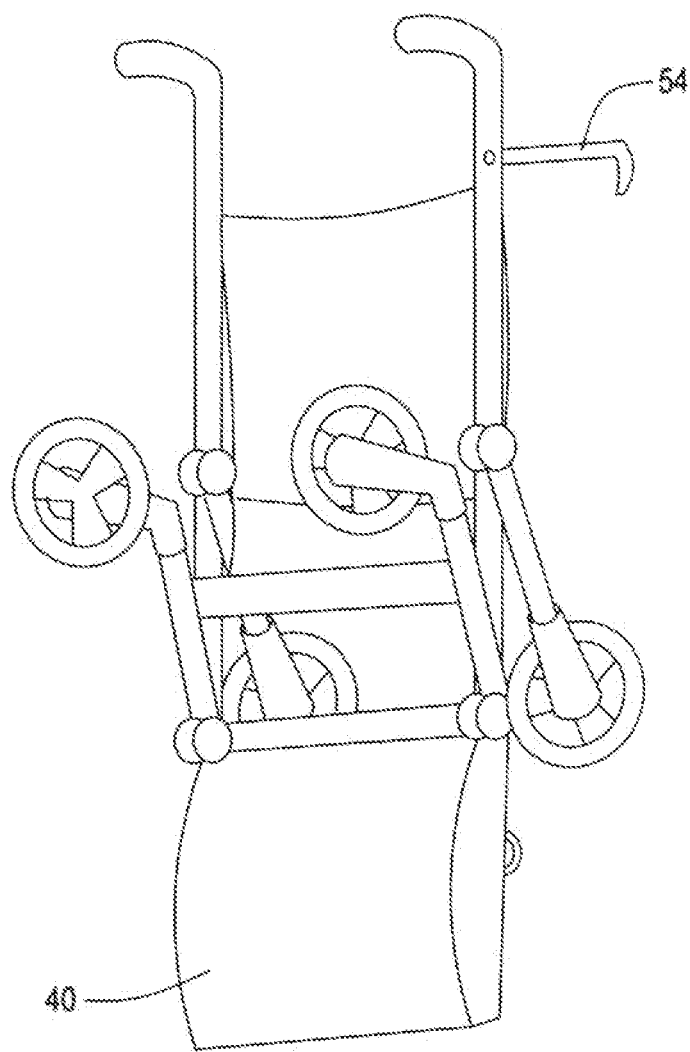
FIG. 4 illustrates the stroller assembly of FIG. 1 in a partially folded position, in accordance with one embodiment.

FIG. 4 illustrates the stroller in a folding position wherein hinges 24a and 24b are rotated such that front legs 28a and 28b are adjacent to lower legs 16a and 16b. Furthermore, cushion 40 is pivoted along a pivot axis 52. In a preferred embodiment a locking fastener 54 is provided so as to lock the entire backpack assembly when all pertinent parts are fully folded.

Figure 5:
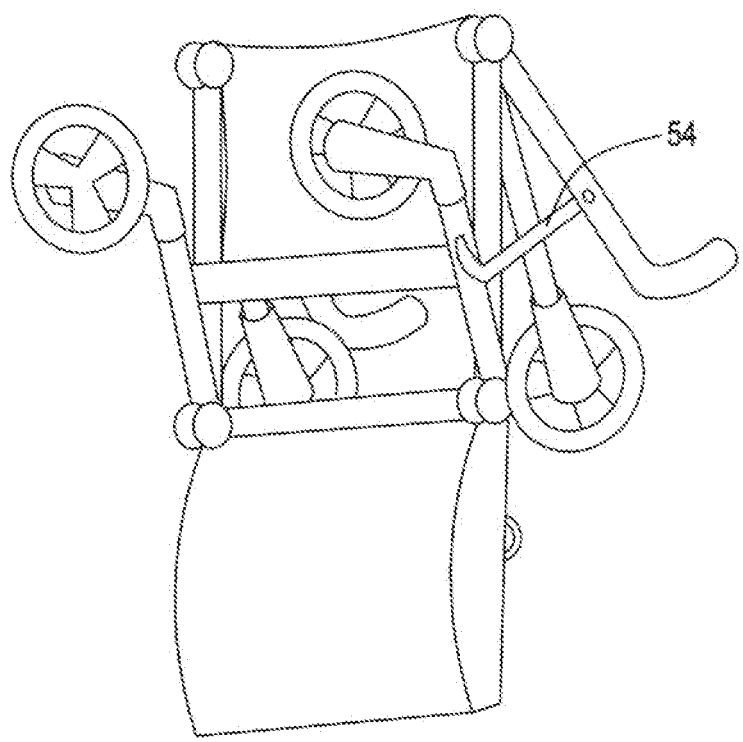
FIG. 5 illustrates the stroller assembly of FIG. 1 in a partially folded position, in accordance with one embodiment.
Figure 6:
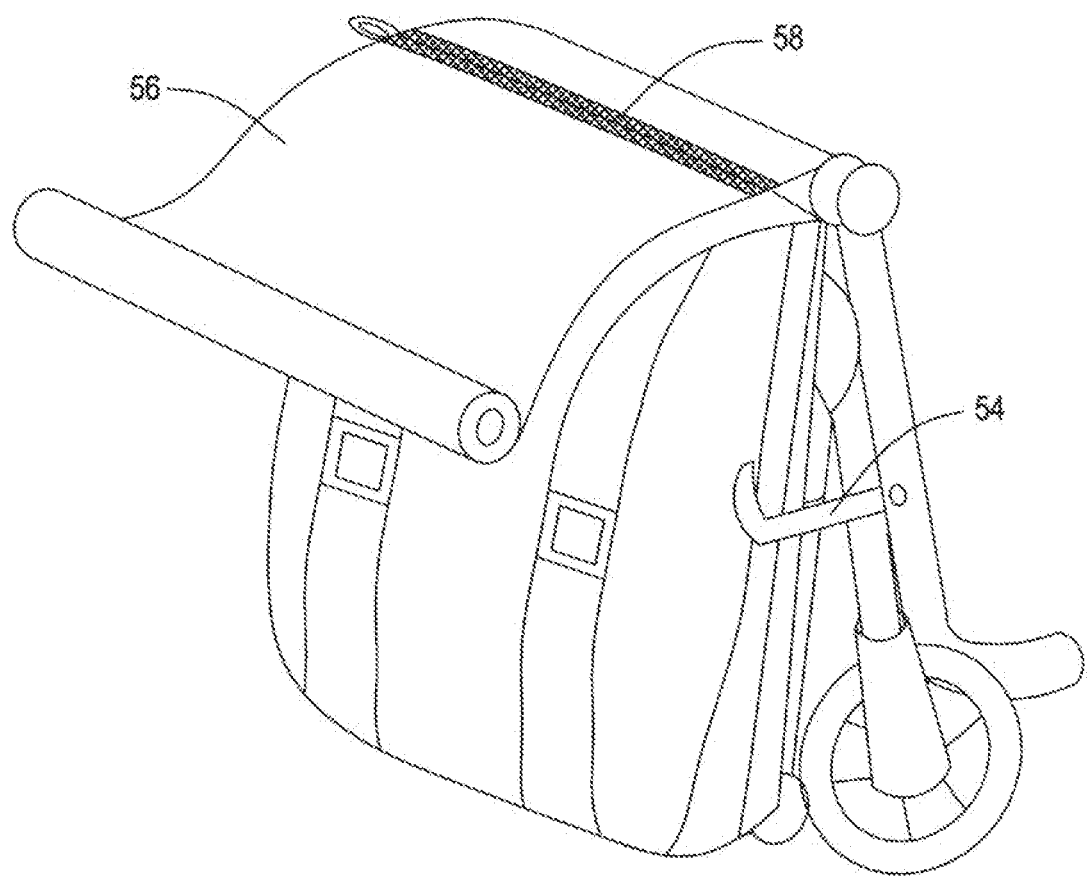
FIG. 6 illustrates the stroller assembly of FIG. 1 in a folded position with cushion, in accordance with one embodiment.

FIG. 5 illustrates the process of folding the stroller wherein hinges 22a and 22b are rotated such that handle bars 14a and 14b are adjacent to rear legs 32a and 32b. As further illustrated in FIG. 6 cushion 40 is folded up against the stroller assembly. In accordance with one embodiment of the invention, cushion 40 includes a protective flap 56 that is attached from one end to the cushion's liner by a fastening means such as zipper 58 from one end and is fastened to the other end of the cushion's liner by a fastening means such as a zipper from the other end. As further illustrated in FIG. 7, protective flap 56 may be rolled up to expose the shoulder straps of the cushion. At the same tune, locking fastener 54 engages a hook mechanism such as 62 so as to hold the entire assembly together.

Figure 7:
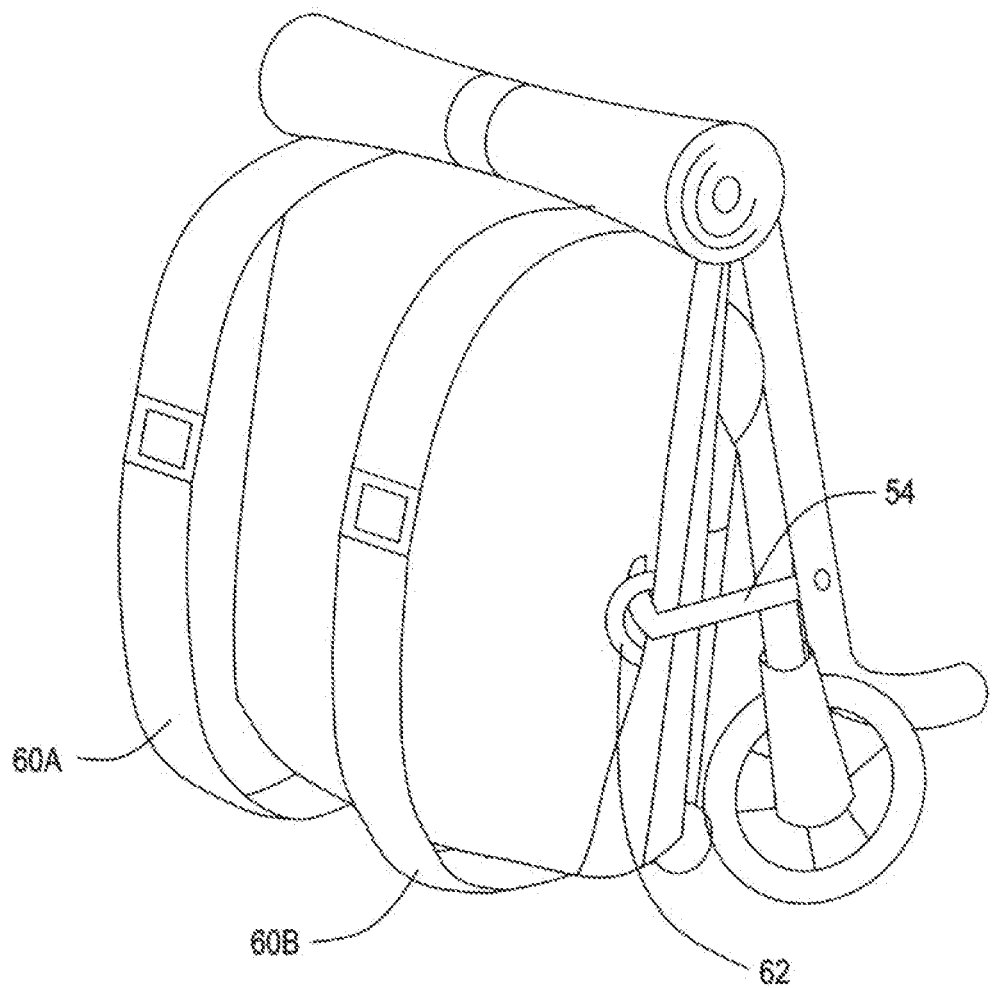
FIG. 7 illustrates the stroller assembly of FIG. 1 in a folded position with cushion and straps, in accordance with one embodiment.

FIG. 7 illustrates stroller assembly 10 fully converted into a backpack. The user can then lift the stroller and carry it on the back, by means of the shoulder strap. Cushion 40 provides separation of stroller assembly 10 from the back and the neck of the user, and also provides further support and comfort for carrying stroller 10 for long periods of time.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A stroller assembly comprising:
   a pair of handle bars;
   a pair of upper hinges;
   a pair of primary front legs;
   a pair of primary rear legs, with wheels attached thereto;
   a second pair of lower hinges;
   a pair of lower front legs, with wheels attached thereto;
   a seat fabric attached to said pair of handle bars, said pair of primary front legs and said pair of primary rear legs; and
   a cushion below said seat fabric connected between said pair of primary rear legs and said pair of lower front legs, said cushion having a pair of straps on an upper side when said stroller assembly is an open configuration,
   wherein said pair of handle bars are pivotable about said pair of upper hinges to rest against said primary rear legs,
   wherein said pair of lower front legs are pivotable about said pair of lower hinges to rest against said pair of primary front legs, and
   wherein said cushion is detachable about a pivot axis and configured to be rotated about said pivot axis to such the lower side of said cushion can be rested against lower front legs rested against said pair of primary front legs.

2. The stroller assembly as claimed in claim 1, wherein said cushion includes a protective cover for said straps, such that when said cushion is rested against lower front legs rested against said pair of primary front legs, said protective cover may be rolled and stored exposing said straps.

3. The stroller assembly as claimed in claim 1, wherein said stroller assembly further comprises a hook mechanism configured to secure said pair of handle bars against said primary rear legs, and said pair of lower front legs against said pair of primary front legs.

* * * * *